Oct. 16, 1956     E. G. PAQUETTE     2,766,721
APPARATUS FOR APPLYING THIXOTROPIC MATERIAL
TO A CONTINUOUS WEB MATERIAL
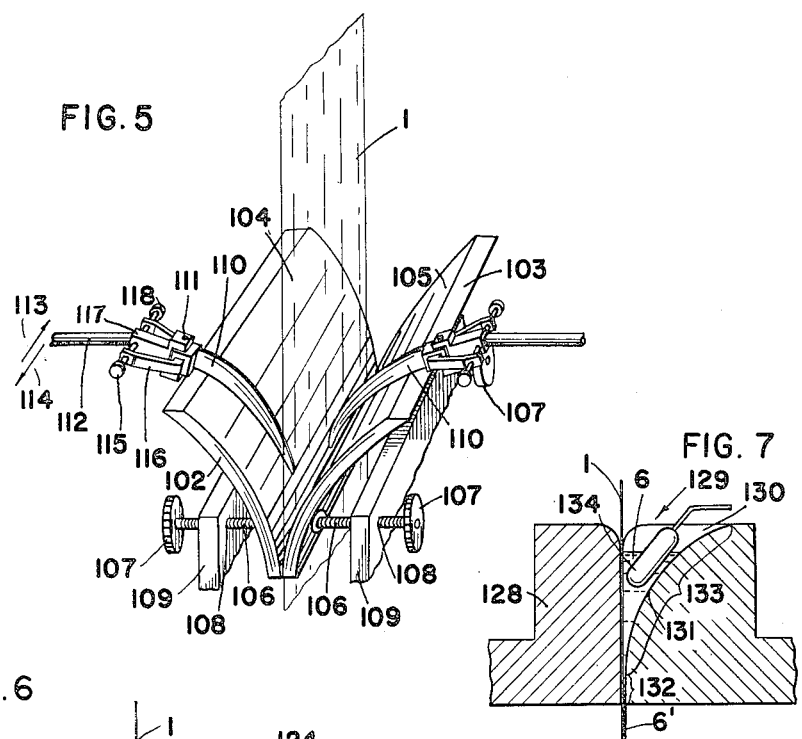
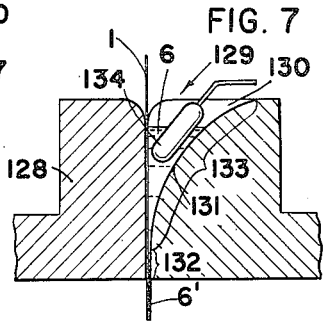
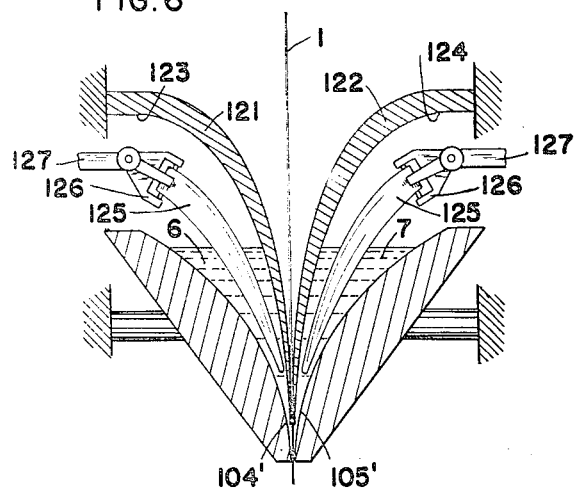
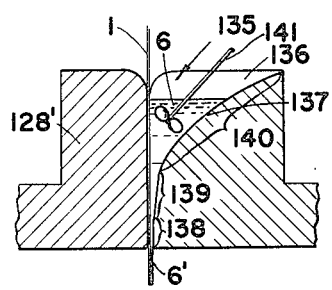
*INVENTOR.*
ELMER G. PAQUETTE Oct. 16, 1956  E. G. PAQUETTE  2,766,721
APPARATUS FOR APPLYING THIXOTROPIC MATERIAL
TO A CONTINUOUS WEB MATERIAL
Filed Sept. 22, 1952  6 Sheets-Sheet 6
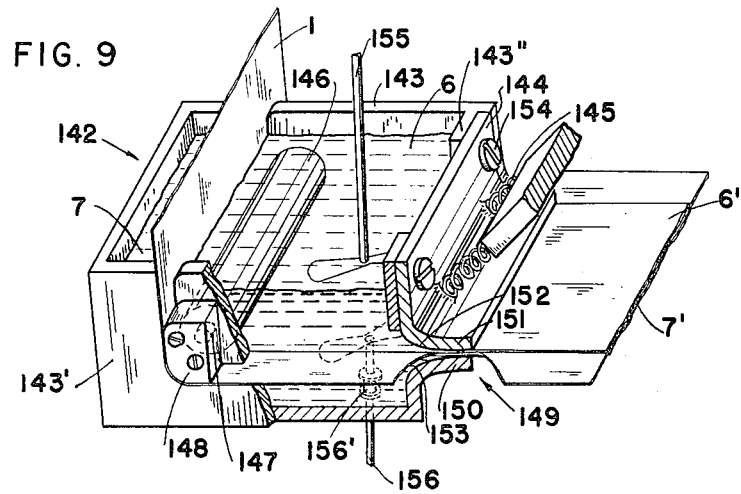
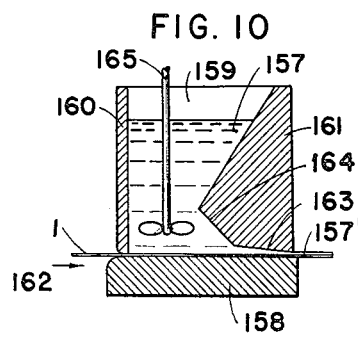
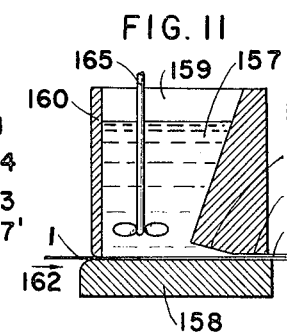
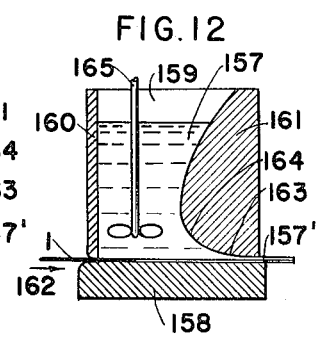
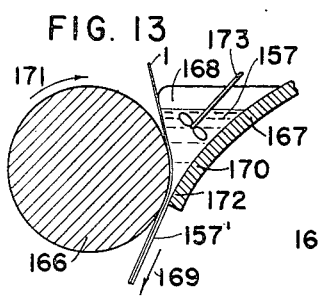
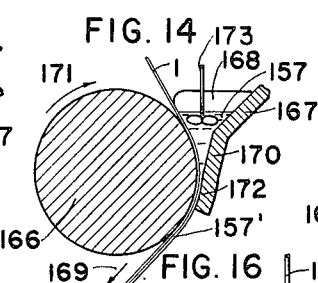
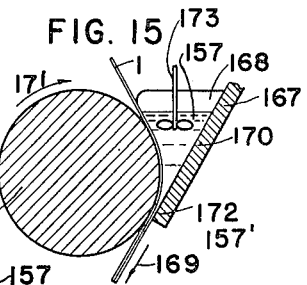
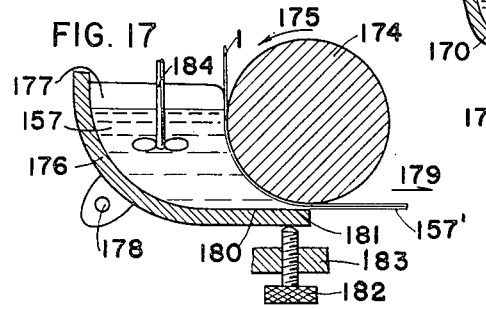
*INVENTOR.*
ELMER G. PAQUETTE
BY John L. Diehl
*Attorney*

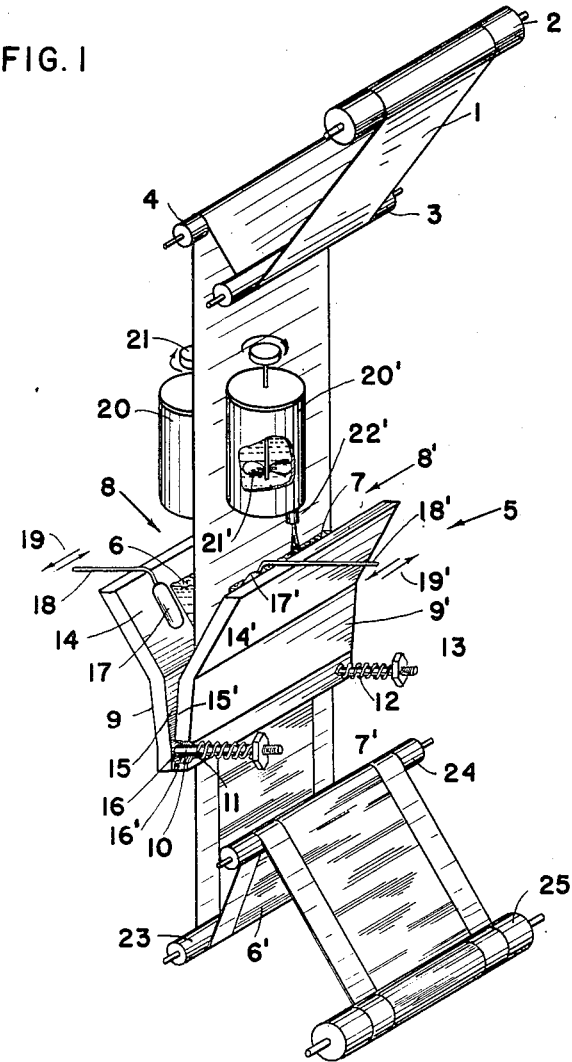
Oct. 16, 1956     E. G. PAQUETTE     2,766,721
APPARATUS FOR APPLYING THIXOTROPIC MATERIAL
TO A CONTINUOUS WEB MATERIAL
Filed Sept. 22, 1952     6 Sheets-Sheet 1
FIG. I
INVENTOR.
ELMER G. PAQUETTE
BY
Attorney

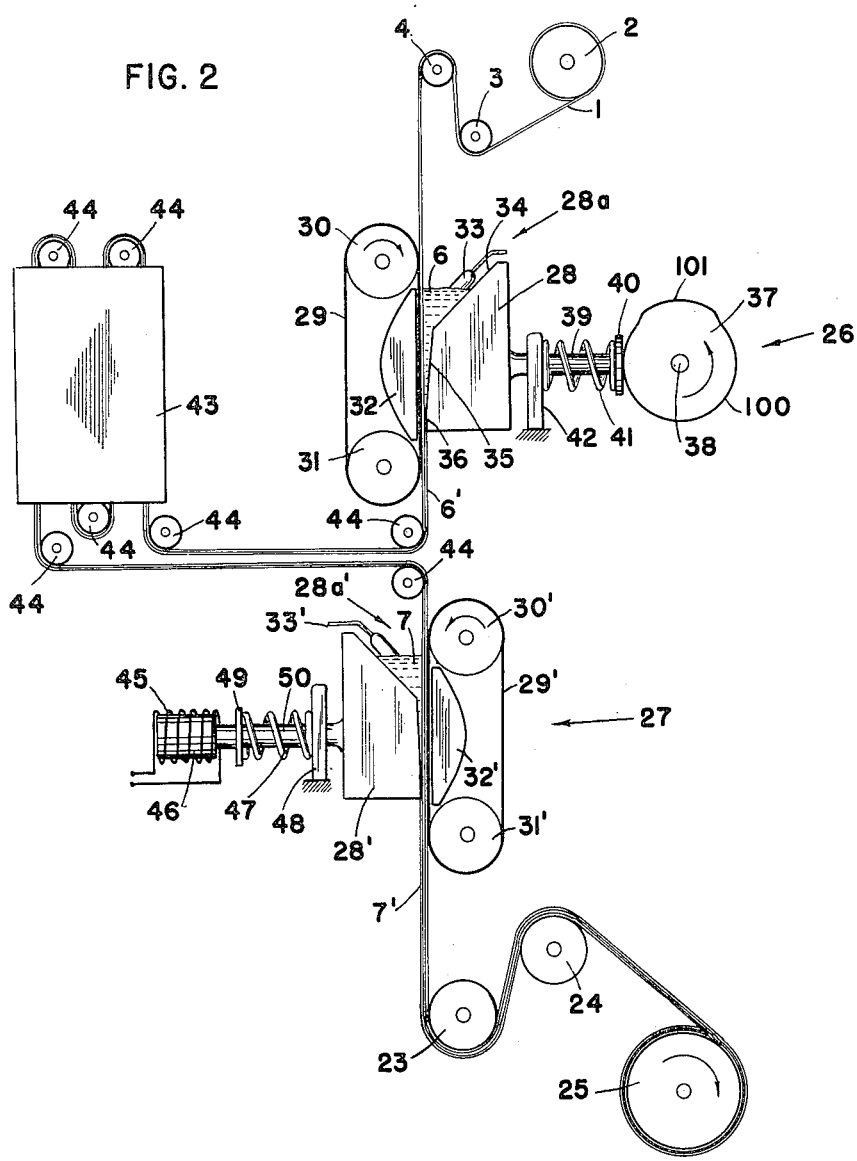

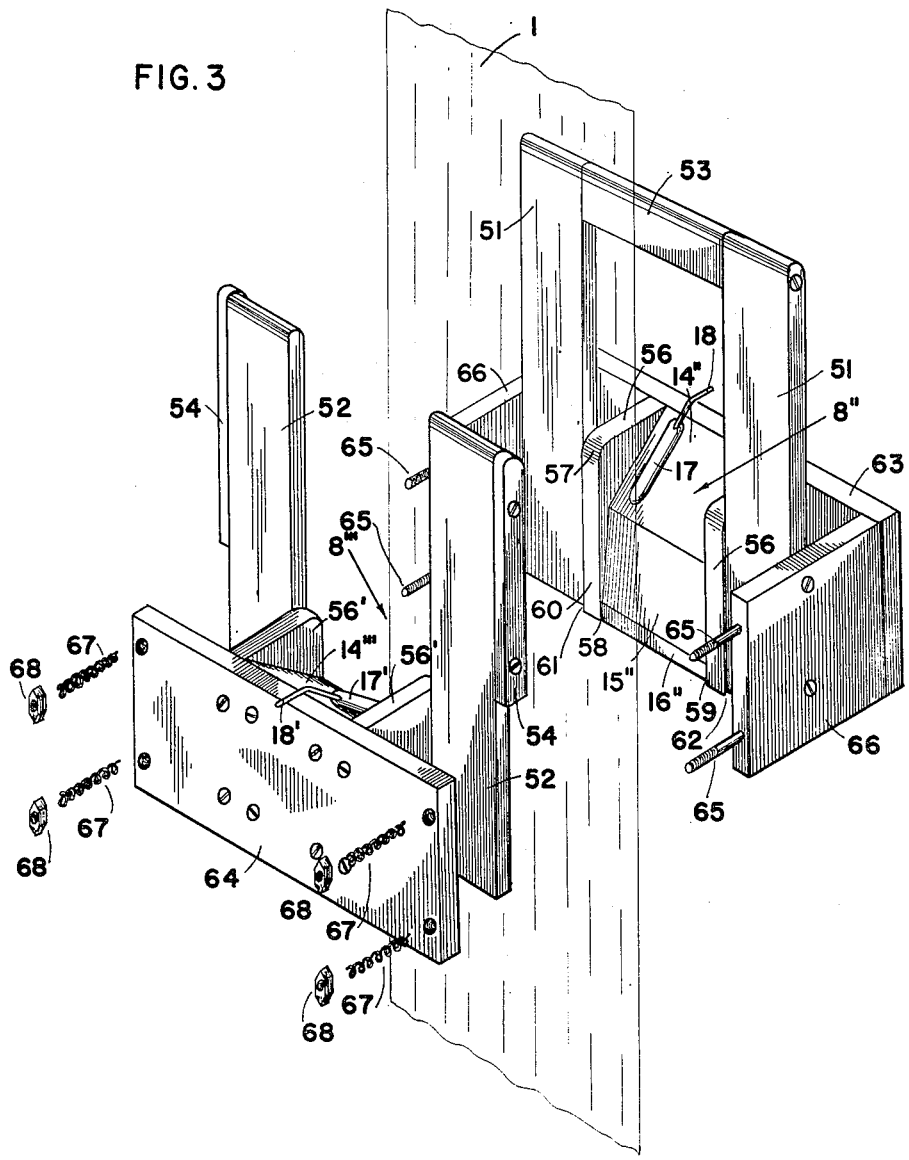

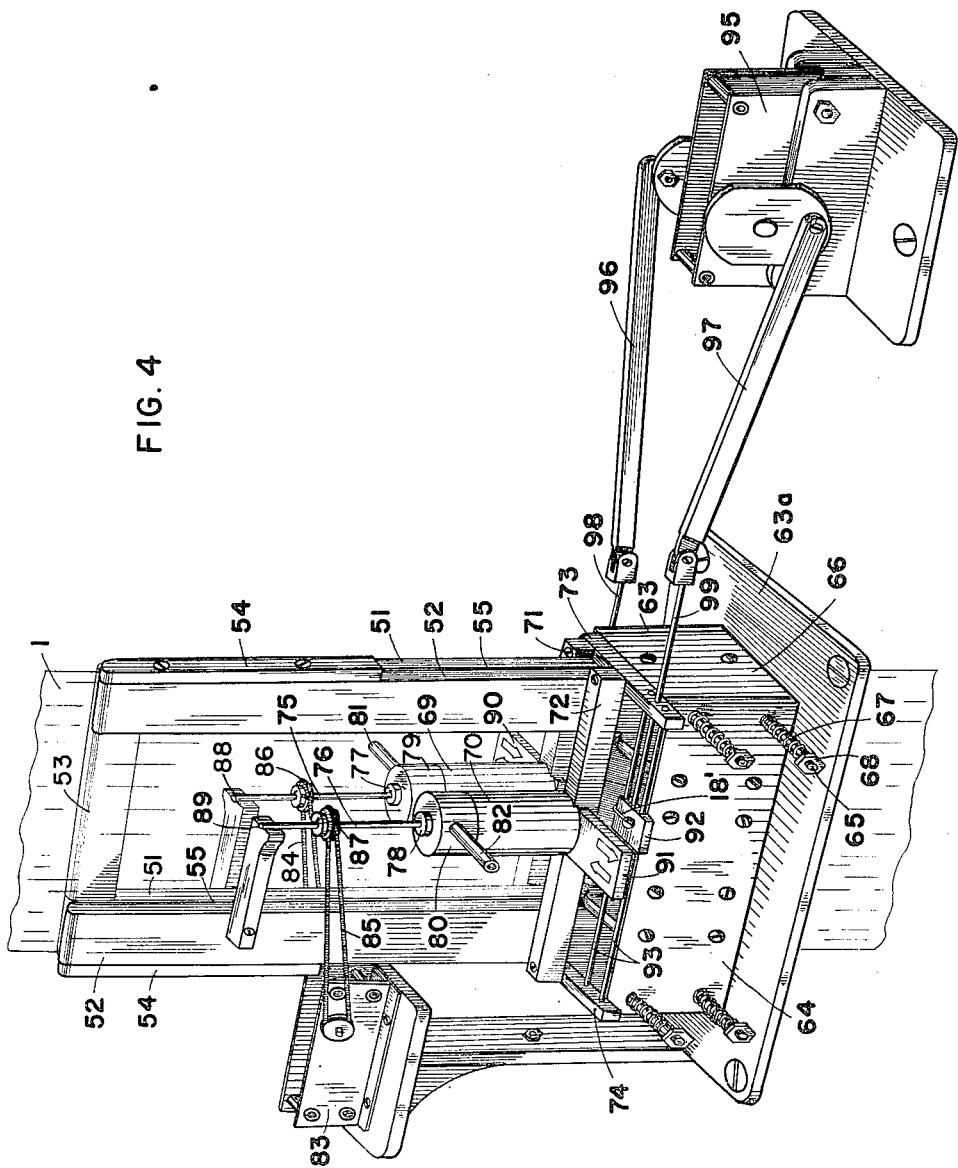

United States Patent Office 2,766,721
Patented Oct. 16, 1956

2,766,721

APPARATUS FOR APPLYING THIXOTROPIC MATERIAL TO A CONTINUOUS WEB MATERIAL

Elmer G. Paquette, Cambridge, Wis., assignor to Bjorksten Research Laboratories, Inc., a corporation of Illinois Application September 22, 1952, Serial No. 310,778

19 Claims. (Cl. 118—405)

This invention relates to a device for applying coatings and more particularly to a device for applying a coating of thixotropic material on a moving tape.

Heretofore battery electrodes have been made by applying, with spatula or some such manual method, a paste of the electro-chemically-active material onto a carrier base. Obviously, it would be highly desirable to produce such electrodes by a much faster and more uniform method such as direct printing. However, it has been found that the thixotropic properties of many of the materials from which such electrode materials are deposited tend to make very difficult, if not impossible, the printing by revolving devices. The finely divided materials generally have a high specific gravity, and with water they show thixotropic properties so that the vehicle is readily abstracted by syneresis, wicking and sedimentation. No suitable transfer method by printing roll, smooth or intagliated, is known. These thixotropic materials are generally slurries and may be spread properly on a base material such as a tape only by a very specific "shoe action" incorporated in my device.

It is therefore an object of this invention to provide a device for applying a layer of substantially uniform thickness of thixotropic slurry to one or both sides of a rapidly moving conductive or nonconductive tape in such manner that the coating is of substantially uniform thickness or of any desired non-uniformity of thickness and may be applied only to a limited area on the tape.

Another object is a method for applying thixotropic material to a tape as a coating thereon.

Another object is a method of making battery components such as positive and negative electrodes for flat or wafer type dry cells by applying to one or both sides of a rapidly moving tape or strip of conductive or nonconductive material a slurry containing electrochemically active ingredients and having thixotropic properties.

Further objects and the full scope of the invention will become apparent from the drawings and the following detailed description, in which it is my intention to illustrate the applicability of the invention, but wthout limiting its scope, and in which like parts are indicated by like reference numerals, and:

Figure 1 is a schematic perspective view of a device for coating a portion of a strip with a thixotropic material;

Figure 2 is a schematic elevation of another embodiment of the device;

Figure 3 is a perspective view from above of the primary working parts of a specific device according to the embodiment of Figure 1;

Figure 4 is a perspective view from above of a completely assembled device according to a modification of the embodiment of Figure 1;

Figure 5 is a schematic perspective view of a device which is a modification of the embodiment of Figure 1;

Figure 6 is a cross-sectional schematic view of an embodiment similar to that of Figure 5 provided with additional means for holding the tape in a desired position at the point at which coatings are applied;

Figures 7 and 8 are cross-sectional schematic views of other embodiments for applying a coating to one side of a tape;

Figure 9 is a partially cut-away perspective view of another embodiment for applying coatings to both sides of a tape simultaneously;

Figures 10, 11 and 12 are schematic cross-sectional views of other embodiments in which a coating of thixotropic material is applied to one surface of a horizontally moving tape;

Figures 13 to 17 are schematic cross-sectional views of embodiments in which a coating of thixotropic material is applied to a surface of a tape which is held in place by a roller.

Referring now to Figure 1, there is shown a tape 1 which is stored on roll 2. Tape 1 may be of any material suitable for use in a battery. It may be a nonconductive material such as plioform (chlorinated rubber), polyethylene or rubber or it may be of conductive material such as a conductive plastic consisting of a synthetic resin composition having incorporated therein a conductive material such as finely divided carbon or finely divided metals or it may be a strip of metal film or sheet such as iron, aluminum or zinc or it may be a fabric having coated thereon or impregnated therein a conductive material such as zinc, cadmium, magnesium, lead, aluminum or oxides of metals such as mercury, manganese, copper, silver or vanadium. Perforated zinc in tape form and tape of woven glass fabric impregnated or coated with silver or silver oxide have been found preferable. The tape must in any event have electrical properties desirable for the particular application and may be resistant to battery electrolyte which is usually caustic or acid.

As tape 1 unrolls off the storage roll 2, it passes over idler roll 3 and then over direction changing roll 4 whereupon it passes vertically downward to the device indicated generally as 5. Device 5 is arranged to provide on one side of the tape and in contact therewith a quantity of the material 6 to be coated on tape 1 and a quantity of material 7 which may be identical with material 6 or may be similar thereto in contact with tape 1 on the other side thereof. Materials 6 and 7 are thixotropic aqueous pastes or slurries such as those disclosed in co-pending application Serial No. 365,977, entitled Electrode and Material Therefor, filed July 3, 1953, now Patent No. 2,708,683. Materials 6 and 7 are held in place in contact with tape 1 by the receptacles indicated generally as 8 and 8', each of which is formed by a receptacle side such as side 9 of receptacle 8 and the surface of tape 1 nearest side 9 and by receptacle ends which are not shown. Materials 6 and 7 are applied to tape 1 by the action of receptacle sides 9 and 9' which are held together in adjustable relationship by bolts 10, attached to receptacle side 9 extending through holes 11 in receptacle side 9' and provided with springs 12 acting against nuts 13 on bolts 10 to hold the two receptacle sides together. The two receptacle sides 9 and 9' thus form a slot at the bottom through which tape 1 passes. Ends for the receptacles 8 and 8', of which 9 and 9' are the sides, are necessary to hold materials 6 and 7 in place, but are omitted from Figure 1 in order to make the invention clearer.

Receptacle side 9, the interior surface of which may be a mirror image of the interior surface of receptacle side 9' and symmetrical therewith in all respects may be divided into three distinct portions. Portion 14 slopes away from the tape at an angle such as 30° or 45° in order to provide a reservoir for a small quantity of material 6 in contact with tape 1 in such a manner as to wet tape 1 prior to the application thereto of material 6 by the lower portions 15 and 16 of receptacle side 9. The slope of portion 14 is not critical since it may be replaced with any configuration suitable for providing a receptacle without at the same time providing any area in which the slurry may become stagnant. Area 15 is almost parallel to tape 1, but slopes away therefrom at a slight angle, which is about 1° to 8°, and has the effect of compressing material 6 against the tape. Area 16 may be parallel to the surface of tape 1 and controls the thickness of the layer applied to the tape by preventing an excess of slurry from passing down from the area between area 15 and the tape and also applies the final compressive force to cause the material to adhere to the tape.

Since materials 6 and 7 are thixotropic they must be stirred or agitated constantly and continually. This is accomplished in receptacles 8 and 8' by reciprocating paddles 17 and 17' which act therein, and which are operated by rods 18 and 18' moving in the direction shown by arrows 19 and 19'. Materials 6 and 7 may flow into receptacles 8 and 8' from reservoirs 20 and 20', which are provided with stirrers 21 and 21'. These may be rotary propeller stirrers as shown or may be any suitable sort of stirrer which is known to the art, such as a reciprocating or vibrating stirrer. The outflow from reservoirs 20 and 20' is controlled by valve 22 (not shown) and valve 22' at the outlets of said reservoirs.

After the tape passes through device 5 it has a coating 6' of material 6 on one side and a coating 7' of material 7 on the other side. The tape is dried by contact with the air, or by means not shown, and then passes over direction changing roll 23, then over idler roll 24, and finally is rolled up and stored on storage roll 25.

It is, of course, obvious that additional rolls may be provided to control the direction or tension of the tape, or to pull it through the device 5.

Referring now to Figure 2, which is a schematic side elevation of another device for applying coatings of thixotropic slurry to a tape, there is shown two units, each of which applies a coating to one side only of a tape. These units are referred to generally as 26 and 27, and may operate in conjunction to apply a coating to each side of the same tape as part of a single process, or either unit may operate independently to apply a coating to only one side of the tape. Tape 1, as described above, is stored on roll 2 and passes therefrom over idler roll 3 and direction changing roll 4 from which it passes vertically downward through either unit 26, unit 27, or both. It may pass first through unit 26 as shown wherein it passes between three distinct surfaces 34, 35, and 36 of block 28 which form one side of the receptacle indicated generally as 28a of which the surface of tape 1 nearest thereto is the other side, the ends thereof not being shown in order to make possible a clearer presentation. Tape 1 is held in place with respect to block 28 by belt 29 which travels around rolls 30 and 31 and which is held in place adjacent to tape 1 by shoe 32. A plain shoe or other guiding device may be used in place of the belt 29 and shoe 32 assembly to hold tape 1 in place in any manner known to the prior art.

Material 6 is supplied to receptacle 28a of unit 26 from a reservoir in which it is constantly agitated (not shown). It is held for a short time in receptacle 28a and is constantly stirred therein by reciprocating paddle 33. It is applied to said surface of tape 1 by the wiping and compressive action of surfaces 35 and 36. Surfaces 34, 35 and 36 have the same relation to the surface of tape 1 as do surfaces 14, 15 and 16.

The width of the space between surface 36 of block 28 and the surface of tape 1 nearest thereto is a major contributing factor in controlling the thickness of coating 6'. Cam 37 is securely attached to rotating shaft 38 and the width of said slot is determined by the radial elevation of surface 100 or 101 of cam 37 from shaft 38. Cam 37 acts through surface 100 or 101 against pushrod 39, attached to block 28, and thus controls the width of said slot. Block 28 is urged outwardly away from tape 1 at all times by the action of spring 39 which is firmly affixed to base 42 and which acts against collar 40 attached to pushrod 39 to hold the said pushrod against outer surface 100 or 101 of cam 37 at all times. Cam 37 may be provided with a portion of its outer surface such as portion 101 being extended radially a slight distance beyond surface 100 such that elevated portion 101 may be adapted to cause said slot to be completely closed and thus provide for discontinuities in coating 6' longitudinally along tape 1 corresponding to the speed at which cam 37 is rotated and corresponding to the angle subtended by elevated surface 101.

After leaving device 26, tape 1 may either pass directly to device 27 or may first pass through drier 43 by being passed over idler and direction changing rolls 44. In drier 43 heat may be applied in order to dry the coating more rapidly or else air currents alone may be relied upon to accomplish the drying. If heat is necessary it may be applied by electric resistance heaters, induction heating or other methods well known to the prior art. After leaving drier 43 and all of rolls 44, tape 1 may pass downward through unit 27 wherein it passes between block 28' on one side and belt 29' on the other which operates over rollers 30' and 31' and is held in place adjacent to tape 1 by shoe 32'. Thixotropic paste or slurry is applied in the same manner in unit 27 as thixotropic paste or slurry 6 is applied in unit 26, said slurry being stirred constantly in receptacle 28a' by paddle 33'. The thickness and continuity of coating 7' which is thereby applied is controlled with respect to the longest axis of tape 1 to which it is applied by the movement toward and away from tape 1 of block 28' in a way similar to the way in which the thickness of coating 6' and its continuity or pattern of discontinuity is controlled by the movement of block 28 driven by cam 37. The position of block 28' is controlled by the interaction of solenoid 45 and spring 47. Spring 47, affixed to base 48, acts against collar 49, firmly attached to push rod 50, which in turn is firmly affixed to block 28' and thereby constantly urges block 28' away from tape 1, thereby providing a slit at the bottom edge of block 28 which coacts with the interior surfaces thereof to apply coating 7'. An electric current may pass through solenoid 45 to create a magnetic field such as to affect iron core 46. Solenoid 45, when energized, urges armature 46 inwardly, overcoming the outwardly directed force of spring 47, and thereby forces block 28' against tape 1. Thus the slit at the bottom edge of block 28 is closed, preventing a coating of any substantial thickness from being applied to tape 1. However, when current to solenoid 45 is interrupted, the outward urging of spring 7 opens said slit and coating 7' is applied. It is obvious, of course, that the directions of action of spring 47 and solenoid 45 may be reversed so that solenoid 45 acts to force block 28' against tape 1 and spring 47 acts to force block 28' away from tape 1. The same is true, of course, of cam 37 and spring 41, which may be so arranged that cam 37, instead of pushing block 28 against tape 1, acts to force block 28 to move away from tape 1 and spring 41 is so arranged as to urge block 28 toward tape 1.

After leaving unit 27 coating 7' is dried by contact with the air or by other means not shown such as a drier comparable to drier 43 and then tape 1, carrying coatings 6' and 7' passes over direction changing roll 23, idler roll 24 and is rolled up and stored on roll 25.

Materials of which receptacle sides, paddles, rolls and other parts of the device are made are generally not critical to the invention; aluminum, stainless steel or a plastic such as polymethyl methacrylate or styrene polymers and copolymers may be preferable in some instances. Appropriate materials for other parts in the device such as cams, springs and solenoids are, of course, well known to the art.

Referring now to Figures 3 and 4, wherein is shown a specific device according to the embodiment of Figure 1, tape 1 shown in shadow outline passes downward through tape-guides 51 on one side and tape-guides 52 positioned opposite thereto on the other side. Tape-guides 51 and 52 are provided at the tops thereof with generally curving surfaces to guide the tape thereinbetween and a tape-guide bar 53 is provided extending between the tops of tape-guides 51 to overcome a slight tendency of the tape to curve laterally. Tape-guide bar 53 helps to keep the tape flat and free from lateral kinks or bends and aligned for travel through the device, but may be omitted if desired. Affixed to the outer side of tape-guides 52 are tape-edge-guides 54 which extend across the slots 55 between guides 51 and guides 52 through which the tape passes. The tops of edge-guides 54 may be curved as shown, in a manner similar to the tops of tape-guides 51 and 52, but this is not necessary or critical. The tape then passes downward between surfaces 14", 15" and 16" on the one side and corresponding surfaces 14"', 15"' (not shown) and 16"' (not shown) on the other side, surfaces 16" and 16"' being substantially parallel to tape 1. Receptacles are thereby created which are indicated generally as 8" and 8"'. Receptacle 8" is formed by surfaces 14", 15" and 16" on one side, the surface of tape 1 nearest thereto on the other side, and by ends 56. Receptacle 8"' is formed by surfaces 14"', 15"' and 16"' on one side, the surface of tape 1 nearest thereto on the other side, and by ends 56'. End walls such as 56 and 56' are provided adjacent to said surfaces to retain the thixotropic slurry within said receptacles and to limit the lateral distribution of the coating applied to tape 1. The corners of these end walls which are adjacent to the tape at the point at which it enters said receptacle may be slightly rounded as shown at 57 to prevent tearing of the tape. It will be noted that as shown at 58 and 59 the end walls 56 and 56' have their surfaces such as 60 extended so as to be slightly closer to said tape than surface 16'' and surface 16''' (not shown) on the opposite side, which apply a final smoothing and compressing step to the coating. In the embodiment shown the coating thickness is thus controlled by the amount of this extension. Tape-guides 51 and 52 are spaced slightly back from the surfaces such as 60 of end walls 56 and 56' which bear directly against the tape and thus provide a relatively firm seal against the tape so the thixotropic slurry does not ooze out sideways or coat the tape in portions laterally adjacent to those areas which it is desired to coat. Tape-guides 51 and 52 are attached to the end walls 56 and 56', but need not be so attached but may be held rigidly in relation to end walls such as 56 by any suitable means. The elements comprising receptacles 8" and 8"' described above, such as surface 14", 15" and 16" and ends 56 and 56' may be attached to supporting plates 63 and 64 on the two sides of the device respectively. Supporting plate 63 is provided intermediate plates 66 attached thereto. Studs 65 may be affixed, as shown, to intermediate plates 66, which in turn are attached to supporting plate 63. It will be understood that other means or equivalent means for adjustably and removably connecting plates 63 and 64 such as those shown in units 26 and 27 in Figure 2 may suitably be used. Studs 65 project through springs 67 and are threaded into nuts 68. Nuts 68 may be so adjusted inwardly or outwardly as to control the degree of force with which plates 63 and 64 and parts attached thereto such as surfaces 16'' and 16''' (not shown) respectively are held together. The device is provided with base plate 63a to which supporting plate 63 is attached and on which plate 64 and the elements attached thereto operate slidably. Base plate 63a is provided with a slot (not shown) in the bottom through which coated tape 1 passes downward when leaving the device.

Thixotropic slurries such as materials 6 and 7 are contained in reservoirs 69 and 70 which are mounted on supporting bars 71 and 72 which in turn are mounted on supporting bars 73 and 74, which are firmly attached to end plates 66 and are not attached to plate 64 or elements attached thereto such as tape-guides 52. The contents of reservoirs 69 and 70 are constantly agitated by means such as the rotary stirrers of which shafts 75 and 76 are shown passing downward through openings in collars 77 and 78 in tops 79 and 80 of reservoirs 69 and 70. Tops 79 and 80 are provided with tubes 81 and 82 which may serve as air vents or may serve as inlet tubes through which additional thixotropic material may be added to reservoirs 69 and 70. Gas pressure may be applied through tubes 81 and 82 to increase the flows of materials 6 and 7 if necessary. The stirrers are rotationally driven by motor 83 driving belts 84 and 85 passing over pulleys 86 and 87 on said shafts. Deflection of said shafts may be obviated or reduced by providing journal bearings at the upper end thereof such as 88 and 89 which are firmly affixed to and are supported by one of tape-guides 51 and one of tape-guides 52, respectively. The amount of slurry which is allowed to pass downward out of each of reservoirs 69 and 70 into receptacles 8" and 8"' is controlled by slide valves 90 and 91 which may be slidably movable in the direction of the arrows shown imprinted thereon. The slurry in the receptacles created by the surfaces such as 14" and 14"' and the end walls such as 56 is constantly agitated by paddles 17 and 17' through rods 18 and 18' attached to sliding blocks such as 92 which slide on pairs of rods such as 93 attached to support bars 73 and 74 and are reciprocally driven by motor 95 through connecting rods 96 and 97 and reciprocating rods 98 and 99 pivotally connected thereto.

Referring now to Figure 5 there is shown two receptacles sides, 102 and 103, having internal curvilinear surfaces 104 and 105 respectively between which tape 1 passes downwardly. Said curvilinear surfaces 104 and 105 operate in the same manner and fulfill the same functions as do rectilinear surfaces 14, 15 and 16, because surfaces 104 and 105 are so curved that their upper portions create reservoirs in conjunction with the sides of tape 1 and with end plates which are not shown whereas the lower portions of their surfaces act as shoes to apply coatings to tape 1, coating materials and the resultant coatings not being shown in Figure 5. Such device provided with curvilinear surfaces may produce results as excellent as those obtained with a device embodying rectilinear surfaces such as 14, 15 and 16, it being preferable that at least the extreme bottom portions of surfaces 104 and 105 be tangential or almost tangential to the adjacent surfaces of tape 1 and that their upper portions be so curved as to provide suitable reservoirs for the coating material. Surfaces 104 and 105 may be cylindrical sections, parabolic sections or any conic or non-conic section, and may be any irregular curve necessary to produce results equivalent to those obtained with rectilinear surfaces such as 14, 15, and 16. Receptacle sides 102 and 103 are held in position by screws 106 which maintain them in the desired spacial relationship with respect to each other and with respect to the adjacent surfaces of tape 1 to control the thickness of the coatings which are applied. Said spacial relationship may be adjusted by rotating hand wheels 107 attached thereto and thereby causing screws 106 to move inwardly or outwardly as a result of their being threaded through threaded holes 108 in firmly mounted blocks 109. Paddles 110 are provided to constantly agitate the coating materials contained in the receptacles created by sides 102 and 103. Paddles 110 may be mounted hingeably as at 111 upon supports such as rod 112 which reciprocates in a direction perpendicular to its own axis as shown by arrows 113 and 114. At such time as rod 112 moves in the direction shown by arrow 113, paddle 110 rotates hingeably until a motion limiting device such as adjustable screw 115, which is threadably mounted in extension 116 of paddle 110, contacts pad 117 on support 112. In this position paddle 110, of course, has an angular relationship to the coating material contained in the reservoir created by side 102 such that as it continues to move it pushes the coating material contained therein downward as well as agitating it. Upon reaching the end of the stroke in the direction of 113, at the furthermost end of receptacle side 102, support 112 begins to move in the direction shown by arrow 114 and as a result paddle 110 rotates hingeably in the other direction until adjustable screw 118 which may have its axis upon the axial line of screw 115, strikes a pad on support 112 and thus tops the rotation of paddle 110. As support 112 continues to move in the direction shown by 114, it will be seen that paddle 110 having an angular relationship to the direction of the motion again pushes the coating material contained in the receptacle created by side 102 downward as well as agitating it.

In Figure 6 there is shown an embodiment similar to that of Figure 5. Tape 1 passes downwardly between curvilinear surfaces 104' and 105' and passes downwardly through the slot created by the lower portions thereof which may be tangential to the adjacent surfaces of tape 1 or at least tangential to a plane at an angle of 0° 1' to 5° thereto. Tape 1 also passes between supporting members 121 and 122 which may be firmly or adjustably mounted and which extend downwardly into the spaces created on each side of tape 1 by surfaces 104' and 105', the bottom portions of members 121 and 122 being thin and springlike and pressing against the respective surfaces of tape 1 near the bottom portions of surfaces 104' and 105'. Leaves 121 and 122 may extend downwardly nearly as far as the bottom of surfaces 104' and 105'. Under no circumstances, of course, do spring leaves 121 and 122 extend downwardly further than do surfaces 104' and 105'. Reservoirs for containing coating material such as 6 and 7 are formed by surfaces 104' and 105' and lower surfaces 123 and 124 of spring leaves 121 and 122 respectively and by end plates which are not shown. Materials 6 and 7 are constantly agitated by paddles 125 which are hingeably mounted at 126 upon reciprocating supports 127, which reciprocate in a plane normal to the surface of the figure. It may be seen that hinge 126 is approximately normal to the upper portion of surfaces 104' and 105' respectively instead of being parallel to the surfaces of tape 1 as is the case with hinges 111 in Figure 5. It is, of course, understood that other mechanical means for accomplishing the same limited hingeable rotation of paddles 110 or 125 is suitable since the invention encompasses any means for causing said paddles to rotate hingeably in a limited degree such that, as the supports therefore reciprocate, paddles force coating materials downward as well as agitate the coating materials. Other means, such as rotating stirrers, may also be used to agitate thixotropic material in said receptacles.

In Figure 7 is shown in cross section another embodiment in which tape 1 is held in position by block 128 frictionally engaging one side of the tape and a receptacle indicated generally as 129 is provided on the other side by receptacle end 130, receptacle side 131, and the side of the tape nearest thereto. Thixotropic material 6 is applied to one side of tape 1 to form coating 6' by the action of receptacle side 131 which is composed of two surfaces 132 and 133. Surface 132 may be flat and parallel to the nearest side of tape 1 or may be at an angle of 0° 1' to 5° thereto. Surface 133 is curvilinear and curves away from tape 1 so that a receptacle for material 6 is provided adjacent to its upper portion and its lower portion acts as a shoe to apply material 6 to tape 1. Material 6 is agitated by reciprocating stirrer 134.

Referring now to Figure 8 there is shown in cross section another embodiment in which tape 1 is held in position by block 128' frictionally engaging one side of the tape and a receptacle indicated generally as 135 is provided on the other side of said tape by receptacle end 136, receptacle side 137, and the side of tape 1 nearest thereto. Thixotropic material 6 is coated on tape 1 to form coating 6' by the action of receptacle side 137 which is composed of two flat planar surfaces 138 and 139 and one curvilinear surface 140. Surface 138 may be parallel to the plane of the nearest surface of tape 1 or may be at an angle of 0° 1' to 5° thereto and surface 139 may be at an angle of 1° to 8° thereto. Material 6 is agitated by rotating stirrer 141.

The device of this invention can carry out coating of thixotropic material on tape at high speeds where such coating cannot be accomplished by either doctor blade coaters or printing rollers.

The receptacle sides may be caused to oscillate or reciprocate by electromagnetic means or by mechanical means as has been shown. Such oscillation may have any desired frequency and the moving tape may sustain alternating compression and release at a rate such that the vibration of the receptacle sides imparts gravitational sedimentation to thixotropic coating material.

Specific material for thixotropic slurries with which this device has been used successfully include, for example:

1. HgO dispersed in distilled water to a heavy paste, in weight ratio 100:35.
2. A mixture of 100 grams $Ag_2O$ and 45 cc. of potassium aluminate solution prepared by dissolving 1 part of dried aluminum hydroxide gel in 1000 parts of 1% aqueous potassium hydroxide.
3. Cadmium powder (325 mesh), 100 grams, dispersed to a homogeneous paste with 40 cc. of 1% aqueous solution of methyl cellulose having a viscosity of 400 cps.
4. AgO, 100 grams, dispersed in 45 cc. of aqueous 0.1% high viscosity sodium carboxymethyl cellulose solution.
5. Zinc powder, 100 grams, dispersed to a medium viscosity paste with 25 cc. of a polyvinyl chloride emulsion containing approximately 4.5% resin solids.
6. A 2.5% solution of aqueous sodium silicate, 1000 cc., ball-milled 20 hours with white, oil-free mineral wool, 25 grams.

In the various members shown, their mechanical equivalents are, of course, included.

I nowhere intend to imply that both sides of tape 1 must be supplied with identical coating mixtures, although the same mixture may be used on each side. Using an electrically suitable tape, one side may be coated with anode mix and simultaneously the other side of the tape may be coated with cathode mixture, resulting in a bipolar battery component, or "plate."

Referring now to Figure 9 there is shown another device according to the invention in which a coating of the thixotropic slurry is applied to each side of a moving tape. Tape 1 moves vertically downward and enters the boxlike device indicated generally as 142, which is made of two sections or receptacles. The upper portion, a receptacle comprising sidewalls 143 and end wall 144, is adapted to contain material 6. The other portion is a receptacle adapted to retain material 7 and comprises walls 143' and other walls. The device indicated generally as 142 may be generally boxlike in form; however, the two receptacle portions are entirely separated from each other by tape 1 which extends outward on each side thru the joint between walls 143 and walls 143'. The two receptacle portions of 142 are urged toward each other by springs 145 to prevent leakage of thixotropic materials 6 and 7 out of the receptacles at said discontinuity. The direction of tape 1 movement is changed by roller 146, which operates entirely within the receptacle containing material 6 and is journaled in walls 143 at 147, and by shoes 148 affixed to the outer surfaces of walls 143. Tape 1 may then move horizontally to pass out from between the two receptacles at 149 where lower shoe 150 and upper shoe 151, each being a planar surface which may be flat or curved, disposed substantially or approximately parallel to the respective upper and lower sides of said tape, that is, at an angle 0° to 5° thereto, coact to form a slit through which tape 1 may move out of the device. Thixotropic materials 6 and 7, respectively, become somewhat thick and adhere somewhat to tape 1 where compressed near tape 1 by the converging portions 152 and 153 of shoes 151 and 150. At thixotropic materials 6 and 7 slide further along the surfaces of shoes 150 and 151 they are further slidably compressed and become quite thick and stiff and are thus caused by shoes 150 and 151 to adhere to tape 1 and form coatings 6' and 7'. Shoe 150 may be a part of a wall of the receptacle containing material 7. Shoe 151 may be a part of wall 144 of the receptacle containing material 6 and may be attached thereto by screws 154. Shoe 151 may therefore be adjustable vertically with respect to said chamber by providing slots in wall 144 thru which screws 154 pass being threadedly engaged in holes in extensions 143" of walls 143. Thixotropic materials 6 and 7 are agitated and stirred constantly by rotating propeller stirrers 155 and 156. The shaft of stirrer 156 may extend through the bottom of the lower receptacle, being provided with packing 156'.

In Figures 10, 11 and 12 there is shown another embodiment in which a coating of thixotropic material 157, which may be any suitable thixotropic slurry such as either material 6 or 7, is applied to tape 1 which moves horizontally. Supporting guide 158 is provided underneath tape 1 to hold it in position as the bottom of a receptacle containing material 157 which is formed otherwise by end 159 and by sides 160 and 161. As tape 1 moves in the direction shown by arrow 162, coating 157' is applied by the action of shoe 163, co-acting with converging portion 164 thereof both of which form portions of the internal surface of receptacle side 161. The material 157 is somewhat compressed and caused to thicken by converging portion 164 and is then finally and firmly compressed by planar shoe 163 which is disposed parallel or almost parallel to the upper surface of tape 1, namely from 0° to 5° to said surface. Material 167 is constantly stirred by propeller stirrer 165.

Referring now to Figures 13, 14, 15 and 16 there are shown other embodiments in which thixotropic material 157 is coated upon tape 1. Roller 166, turning in the direction shown by arrow 171, supports tape 1 in such position as to allow tape 1 to form one side of a receptacle of which the other side is 167 and the ends are 168. As tape 1 moves in the direction shown by arrow 169, thixotropic material 157 is somewhat compressed and thereby somewhat thickened and caused to become somewhat adherent to tape 1 by converging portion 170 of shoe 172. The thickened material is then finally compressed and caused to adhere to tape 1 by shoe 172, shoe 172 and converging portion 170 being portions of the internal surface of receptacle side 167 and being either parallel to the surface of tape 1 or tangent to a plane parallel to the surface of tape 1 at the point in which the final step in coating 157' takes place or at least disposed in a plane or tangent to a plane disposed at an angle 0° to 5° to said surface of tape 1. Material 157 is constantly agitated by stirrer 173.

Referring now to Figure 17 tape 1 passes under roll 174 turning in the direction shown by arrow 175. The side of tape 1 more remote from roll 174 serves as one side of a receptacle of which side 176 and ends 177 are respectively the other walls thereof. Side 176 is adapted to rotate hingeably upon journal 178. As tape 1 moves in the direction shown by arrow 179, thixotropic coating material 157 is compressed and somewhat thickened and caused to adhere to some degree to tape 1 by converging portion 180 of shoe 181. Said thickened thixotropic material is then finally compressed and formed into coating 157' by shoe 181. The thickness of coating 157' may be controlled to some degree by adjusting the distance between shoe 181 and adjacent portion of roll 174 by adjustment of screw 182 threadably inserted in fixed support 183 adjusted to cause side 176 to rotate about journal 178. Shoe 181 is preferably disposed in a plane parallel to a plane tangent to the next adjacent surface of roll 174 but may be at an angle of from 0°1' to 5° thereto. Material 157 is constantly stirred and agitated by stirrer 184. Although the surface of support roll 174 which is adjacent to tape 1 moves with tape 1 so that there is virtually no friction between the surface of the support and the adjacent surface of tape 1, shoe 181 is static with respect to tape 1 and is adapted to allow tape 1 to move past it. As coating 157' is formed it adheres to tape 1 and moves frictionally over the surface of shoe 181.

It may be observed that the same is true of all other embodiments: A moving tape is provided with a shoe in close proximity thereto which is static with respect to the direction of motion of the tape and is adapted to allow thixotropic coating material to flow and slide frictionally along its surface while moving with said tape at the velocity of said tape or at a velocity approaching that of said tape as it passes by said shoe.

It is thus seen that the invention is broad in scope, and is not to be limited excepting by the claims, in which it is my intention to cover all novelty inherent in the invention as broadly as possible, in view of prior art.

Having thus disclosed my invention, I claim:

1. A device for applying a coating of thixotropic slurry to at least one side of a moving tape comprising a shoe comprising a substantially planar surface substantially parallel to one surface of said tape, disposed at a slight distance therefrom to provide a slit between said tape and said shoe, said shoe fixed in position so as to allow said tape to move past it, means for feeding said slurry into said space between said shoe and said tape, receptacle means for providing a static head of said slurry above said feeding means and for retaining said slurry in contact with one side of said tape prior to the application of said coating, means for supporting said tape in desired space relationship to said shoe and said receptacle means, and means for moving and guiding said tape into conjunction with said receptacle means, shoe and supporting means further characterized by being provided with a moving blade in said receptacle adapted to agitate said thixotropic slurry contained therein.

2. A device for applying a coating of thixotropic slurry to at least one side of a moving tape, comprising a shoe comprising a substantially planar surface disposed at an angle of 0°1' to 5° to the nearest surface of said tape, disposed at a slight distance therefrom to provide a slit between said tape and said shoe, said shoe fixed in a position to allow said tape to move past it, means for feeding said slurry into said space between said shoe and said tape, receptacle means for providing a static head of said slurry above said feeding means and for retaining said slurry in contact with one side of said tape prior to the application of said coating, means for supporting said tape in desired space relationship to said shoe and said receptacle means, and means for moving and guiding said tape into conjunction with said receptacle means, shoe and supporting means further characterized by being provided with reciprocating means in said receptacle adapted to agitate said thixotropic slurry contained therein.

3. A device for applying a coating of thixotropic slurry to at least one side of a moving tape comprising a shoe comprising a substantially planar surface disposed at an angle of 0° to 5° to the nearest surface of said tape, disposed a slight distance therefrom to provide a slit between said tape and said shoe, said shoe being adapted to allow said tape to move past it, receptacle means for providing a static head of said slurry above said shoe, said receptacle being formed by said side of said tape, ends, and a side of which said shoe is a portion, and of which another portion provides means for feeding said slurry into said space between said shoe and said tape, said receptacle thus being adapted to retain said slurry in contact with one side of said tape prior to the application of said coating, means for supporting said tape in desired space relationship to said shoe and said receptacle, and means for moving and guiding said tape into conjunction with said receptacle means, shoe and supporting means further characterized by being provided with a reciprocating handle in said receptacle adapted to agitate said thixotropic slurry contained therein.

4. The device of claim 3 in which said receptacle side is provided with at least one plane surface and one curvilinear surface, said plane surface being substantially parallel to said nearest surface of said tape, being said shoe portion and being the most downstream portion of said receptacle side, said curvilinear surface being disposed away from said surface of said tape in such manner as to provide a receptacle space for containing said slurry.

5. The device of claim 3 in which said receptacle side is provided with a curvilinear surface, the most downstream portion of said curvilinear surface being substantially tangent to a plane parallel to said nearest surface of said tape and constituting said shoe portion, the most upstream portion of said curvilinear surface being disposed away from said nearest surface of said tape in such manner as to provide a receptacle space for containing such slurry.

6. The device of claim 3 wherein said receptacle side is provided with at least two substantially flat surfaces, the more downstream of said surfaces being substantially parallel to said nearest surface of said tape and constituting said shoe portion, the more upstream said surface being disposed away from said surface of said tape in such manner as to provide a receptacle space for containing said slurry.

7. The device of claim 3 wherein said receptacle side is provided with three flat surfaces adjacent each other the lowest of said surfaces being substantially parallel to said nearest surface of said tape, the uppermost surface being disposed away from said surface of said tape in such manner as to provide a receptacle space for containing said slurry, and the intermediate said surface being at an angle of from 1° to 8° with respect to said surface of said tape.

8. The device of claim 7 wherein said receptacle side is urged toward said nearest side of said tape by spring means.

9. The device of claim 7 wherein said receptacle side is adjustably positioned with respect to said positioning means on the opposite side of said tape therefrom by screw means.

10. The device of claim 7 wherein said receptacle side is movable on an axis perpendicular to said nearest side of said tape and is reciprocated on said axis by the conjunction of spring means and cam means.

11. The device of claim 10 wherein said receptacle side is reciprocated on said axis by the conjunction of spring means and solenoid means.

12. The device for applying a coating of thixotropic slurry to at least one side of a moving tape comprising a shoe comprising a substantially planar surface disposed at an angle of 0° to 5° to the nearest surface of said tape, disposed a slight distance therefrom to provide a slit between said tape and said shoe, said shoe being adapted to allow said tape to move past it, receptacle means for providing a static head of said slurry above said shoe, said receptacle being formed by said side of said tape, ends, and a side of which said shoe is a portion, and of which another portion provides means for feeding said slurry into said space between said shoe and said tape, said receptacle thus being adapted to retain said slurry in contact with one side of said tape prior to the application of said coating, means for supporting said tape in desired space relationship to said shoe and said receptacle, and means for moving and guiding said tape into conjunction with said receptacle means, shoe and supporting means, further characterized by being provided with a reciprocating paddle in said receptacle adapted to agitate said thixotropic slurry contained therein.

13. The device of claim 12 in which said paddle is hingedly attached to said support and is provided with stops adapted to limit its hingeable rotation in each direction.

14. A device for applying a coating of thixotropic slurry on at least one side of a moving tape, comprising means for storing tape, means for causing said tape to move vertically downward, means for guiding said moving tape comprising vertical guide bars positioned on opposite sides of said tape adapted to guide said tape vertically downward into conjunction with a receptacle side and receptacle ends in such manner that one side of said tape forms a side of said receptacle opposite the said receptacle side, a receptacle side disposed on one side of said tape, an upper portion thereof being adapted to form a reservoir in coaction with said side of said tape, a lower portion thereof being adapted to act as a shoe for applying said coating and to form a slit through which said tape may move downward, receptacle end walls disposed adjacent said side of said tape and means on the opposite side of said tape therefrom adapted to hold said tape in position adjacent said receptacle ends and substantially parallel to said lower shoe portion of said receptacle side, said slit being defined on one side by said positionnig means, on the other side by the lowest portion of said receptacle side and on the ends by said receptacle ends, said receptacle ends being attached to said receptacle side, and projecting outward therefrom toward said tape in such manner as to frictionally engage the adjacent surface of said tape and prevent the lowest portion of said receptacle side from engaging the nearest surface of said tape, means operating in said receptacle adapted to agitate thixotropic slurry contained therein, means for supplying agitated thixotropic slurry to said receptacle at a controllable rate and means for storing tape coated by said device.

15. The device of claim 14 in which said receptacle side comprises a curvilinear surface the bottom portion of said curvilinear surface being tangent to a plane parallel to the nearest surface of said tape and adapted to serve as a shoe to apply said coating.

16. The device of claim 14 wherein said receptacle side comprises three plane surfaces adjacent each other, the lowest of such surfaces being a shoe surface and parallel to the nearest surface of said tape, the uppermost surface being inclined away from said surface of said tape in such manner as to provide a receptacle space for containing said slurry and the intermediate plane surface being at an angle of from 1° to 8° with the surface of said tape.

17. A device for applying a coating of thixotropic slurry on at least one side of a moving tape, comprising means for storing tape, means for causing said tape to move vertically downward, means for guiding said moving tape comprising two pairs of vertical guide bars positioned on opposite sides of said tape adapted to guide said tape vertically downward into conjunction with a receptacle side and receptacle ends in such manner that one side of said tape forms a side of said receptacle opposite the said receptacle side, a horizontal guide bar extending from the top of one of said vertical guide bars to the top of the other vertical guide bar on the same side of said tape, said horizontal guide bar adapted to restrain kinking of said tape, two vertical edge guide bars attached respectively to the outer edges of members of one of said pairs of vertical guide bars, said edge guide bars being adapted to prevent lateral movement of said tape from between said pairs of vertical guide bars, a receptacle side disposed on one side of said tape, an upper portion thereof being adapted to form a reservoir in coaction with said side of said tape, a lower portion thereof being adapted to act as a shoe for applying said coating and to form a slit through which said tape may move downward, receptacle end walls disposed adjacent said side of said tape and means on the opposite side of said tape therefrom adapted to hold said tape in position adjacent said receptacle ends and substantially parallel to said lower shoe portion of said receptacle side, said slit being defined on one side by said positioning means, on the other side by the lowest portion of said receptacle side and on the ends by said receptacle ends, said receptacle ends being attached to said receptacle side, and projecting outward therefrom toward said tape in such manner as to frictionally engage the adjacent surface of said tape and prevent the lowest portion of said receptacle side from engaging the nearest surface of said tape, a reciprocating paddle operating in said receptacle adapted to agitate thixotropic slurry contained therein, means for supplying agitated thixotropic slurry to said receptacle at a controllable rate and means for storing tape coated by said device.

18. A device for applying a coat of thixotropic slurry to at least one side of a moving tape comprising a shoe disposed at a slight distance from said tape to provide a slit between said tape and said shoe, said shoe fixed in position so as to allow said tape to move past it, means for feeding said slurry into said slit, receptacle means for providing a static head of said slurry above said feeding means and for retaining said slurry in contact with one side of said tape prior to the application of said coating, means for supporting said tape in desired space relationship to said shoe and said receptacle means, and means for moving and guiding said tape into conjunction with said receptacle means, shoe and supporting means, further characterized by being provided with a moving blade in said receptacle adapted to agitate said thixotropic slurry contained therein.

19. A device for applying a coating of thixotropic slurry to at least one side of a moving tape comprising a shoe spaced slightly apart from said tape and fixed in position with respect thereto so as to allow said tape to move past said shoe, receptacle means for providing a static head of said slurry above and in contact with said shoe and for retaining said slurry in contact with one side of said tape prior to the application of said coating, means for supporting said tape in desired space relationship to said shoe and said receptacle means, and means for moving and guiding said tape into conjunction with said receptacle means, shoe and supporting means, further characterized by being provided with a moving blade in said receptacle adapted to agitate said thixotropic slurry contained therein.

References Cited in the file of this patent
UNITED STATES PATENTS

| | | |
|---|---|---|
| 1,236,002 | Nivling | Aug. 7, 1917 |
| 1,484,705 | Frothingham et al. | Feb. 26, 1924 |
| 1,676,363 | Seidell et al. | July 10, 1928 |
| 1,972,457 | O'Brien et al. | Sept. 4, 1934 |
| 1,989,800 | Gustin | Feb. 5, 1935 |
| 2,024,284 | Grower | Dec. 17, 1935 |
| 2,534,320 | Taylor | Dec. 19, 1950 |

FOREIGN PATENTS

| | | |
|---|---|---|
| 309,866 | Great Britain | Jan. 30, 1930 |
| 600,687 | Great Britain | Apr. 15, 1948 |